(12) United States Patent
Parsania et al.

(10) Patent No.: US 7,927,078 B2
(45) Date of Patent: Apr. 19, 2011

(54) WIND TURBINE BLADE TIP VORTEX BREAKERS

(75) Inventors: Nishant Parsania, Bangalore (IN); Kevin Standish, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 900 days.

(21) Appl. No.: 11/827,532

(22) Filed: Jul. 12, 2007

(65) Prior Publication Data
US 2009/0016891 A1 Jan. 15, 2009

(51) Int. Cl.
F03D 11/00 (2006.01)

(52) U.S. Cl. .......... 416/235; 416/228

(58) Field of Classification Search .......... 416/235, 416/236 R, 228, 146 R; 415/4.3, 4.5, 908; 290/44, 55
See application file for complete search history.

(56) References Cited

U.S. PATENT DOCUMENTS

| | | | |
|---|---|---|---|
| 4,128,363 A * | 12/1978 | Fujikake et al. | 416/236 A |
| 4,238,094 A | 12/1980 | McGann | |
| 4,655,419 A | 4/1987 | van der Hoeven | |
| 5,217,349 A * | 6/1993 | Succi | 415/119 |
| 5,806,807 A | 9/1998 | Haney | |
| 6,334,705 B1 * | 1/2002 | Weetman | 366/330.1 |
| 6,422,518 B1 | 7/2002 | Stuff et al. | |
| 7,144,216 B2 | 12/2006 | Hessel | |
| 2003/0123973 A1 | 7/2003 | Murakami | |
| 2005/0186076 A1 | 8/2005 | Hessel | |
| 2006/0018759 A1 * | 1/2006 | Moser | 416/223 R |
| 2006/0216153 A1 | 9/2006 | Wobben | |
| 2007/0025858 A1 | 2/2007 | Driver et al. | |
| 2007/0031237 A1 | 2/2007 | Bonnet | |

FOREIGN PATENT DOCUMENTS

WO  WO 2006059472  8/2006

OTHER PUBLICATIONS

"A Review of Wind Turbine Noise," DEWI Magazin, Nr. 28, at pp. 32-39 (Feb. 2006).

* cited by examiner

*Primary Examiner* — Ninh H Nguyen
(74) *Attorney, Agent, or Firm* — William F. Heinze; Ernest G. Cusick; Frank A. Landgraff

(57) ABSTRACT

A wind turbine includes a tower supporting a drive train with a rotor, at least one blade extending radially from the rotor; and a plurality of substantially flat flaps extending substantially perpendicular from a suction surface of the blade and along different chord lines near a tip of the blade for capturing and directing tip vortices toward a trailing edge of the blade.

6 Claims, 5 Drawing Sheets

US 7,927,078 B2

WIND TURBINE BLADE TIP VORTEX BREAKERS

BACKGROUND OF THE INVENTION

1. Technical Field

The subject matter described here generally relates to fluid reaction surfaces with specific blade structures, and, more particularly, to wind turbines having vortex breakers near the tip of the blades.

2. Related Art

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator or wind power plant.

Wind turbines use an airfoil in the form of a blade to generate lift and capture momentum from moving air that is them imparted to a rotor. The blade is typically secured to a rotor at its root end, and extends radially to free, tip end. The front, or leading edge, of the blade connects the forward-most points of the blade that first contact the air. The rear, or trailing edge, of the blade is where airflow that has been separated by the leading edge rejoins after passing over the suction and pressure surfaces of the blade. A chord line connects the leading and trailing edges of the blade in the direction of the typical airflow across the blade. The length of a chord line is simply referred to simply as the chord.

The outboard ends of the blade are called tips and the distance from the tip to the root, at the opposite end of the blade, is called the span. Since many blades change their chord over the span from root to tip, the chord length is referred to as the root chord, near the root, and the tip chord, near the tip of the blade. The resulting shape of the blade, when viewed perpendicular to the direction of flow, is called the planform. Since the thickness of a blade will typically vary across the planform, the term thickness is typically used to describe the maximum distance between the low pressure suction surface and the high pressure surface on the opposite side of the blade. As with other airfoils, wind turbine blades are sometimes provided with flat, usually thin, plates attached at one edge, and referred to as flaps.

Wind turbines are typically categorized according to the vertical or horizontal axis about which the turbine rotates. Horizontal configurations are most common in modern wind turbine machines and one so-called horizontal-axis wind generator is schematically illustrated in FIG. 1, copied from U.S. Pat. No. 7,144,216. This particular configuration for a wind turbine 1 includes a tower 2 supporting a drive train 4 with a rotor 6 that is covered by a protective enclosure referred to as a nacelle. Blades 8 are arranged at one end of the rotor 6 outside the nacelle for driving a gearbox 10 and electrical generator 12 at the other end of the drive train 4 inside the nacelle.

The "upwind" configuration shown in FIG. 1, where the rotor 6 faces into the wind, helps to reduce noise by eliminating the wind shadow of the tower 2 that can other result in an impulsive thumping sound. Other aspects of wind turbine noise have also been addressed by providing quieter gearboxes, soundproofed nacelles, and streamlined nacelles and towers. More efficient blade designs that convert less of the wind's energy into aerodynamic noise have also been sought.

For example, U.S. Patent Publication No. 20060216153 discloses a rotor blade for a wind power plant with a tip that is curved or angled at it end region in the direction of the pressure side of the blade. In order further to reduce the levels of sound emission, the blade is curved or angled in its edge region in the direction of the trailing edge of the rotor blade in the plane of the rotor blade. An English-language abstract of World Intellectual Property Organization Publication No. 2006059472 also discloses a propeller wherein the tip parts of the propeller blades of a horizontal-shaft windmill are tilted in the front direction of the propeller blades. However, these and other conventional approaches to blade tip configuration do not adequately address the problems of aerodynamic efficiency and wing tip noise because they can actually increase blade drag which correspondingly reduces turbine power.

BRIEF DESCRIPTION OF THE INVENTION

These and other drawbacks associated with such conventional approaches are addressed here in by providing, in various embodiments, a blade for a wind turbine including a plurality of substantially flat flaps extending from a suction surface of the blade and along different chord lines near a tip of the blade. The subject matter disclosed here also relates to a wind turbine, including a tower supporting a drive train with a rotor, at least one blade extending radially from the rotor, and a plurality of substantially flat flaps extending substantially perpendicular from a suction surface of the blade and along different chord lines near a tip of the blade. Also provided is a noise reduction system for a wind turbine blade, including a plurality of substantially flat flaps for breaking vortices near a tip of the wing, where each flap extending substantially perpendicular from a base for securing to a suction surface of the blade with an edge of each flap extending along a different chord line near a tip of the blade.

BRIEF DESCRIPTION OF THE DRAWINGS

Various aspects of this technology will now be described with reference to the following figures ("FIGs.") which are not necessarily drawn to scale, but use the same reference numerals to designate corresponding parts throughout each of the several views.

DETAILED DESCRIPTION OF THE INVENTION

Figure 1:
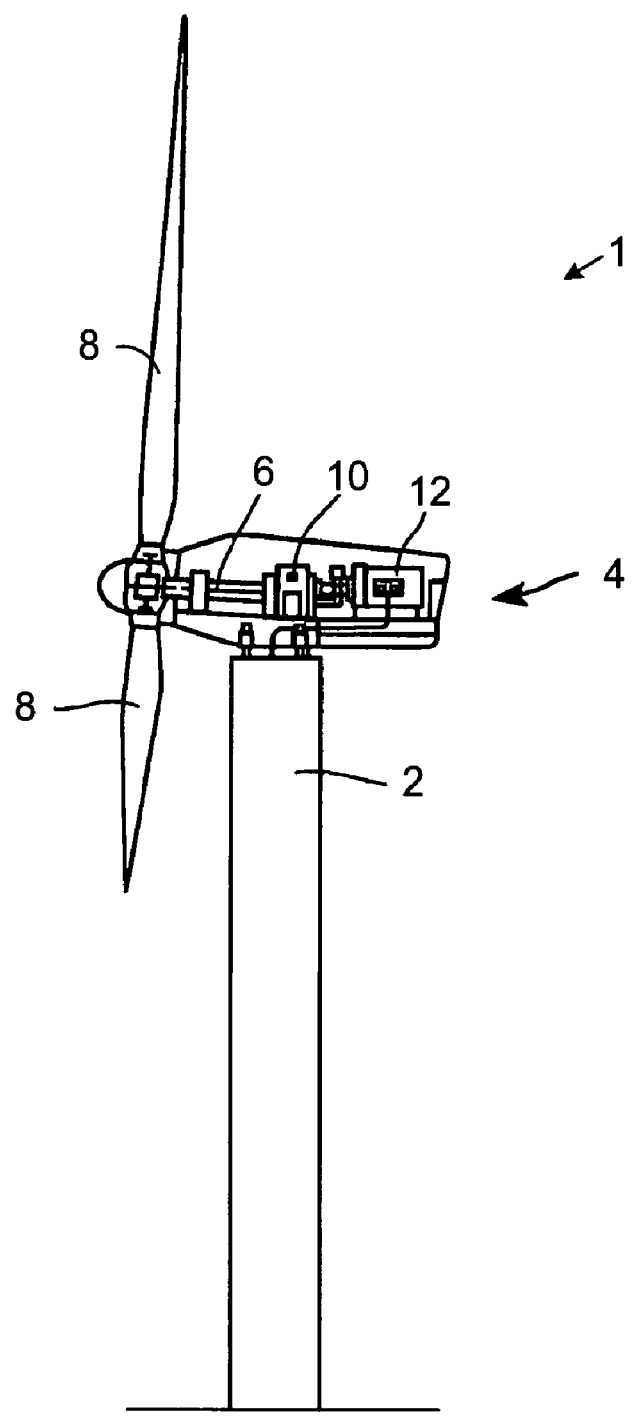
FIG. 1 is a schematic illustration of a conventional wind turbine.
Figure 2:
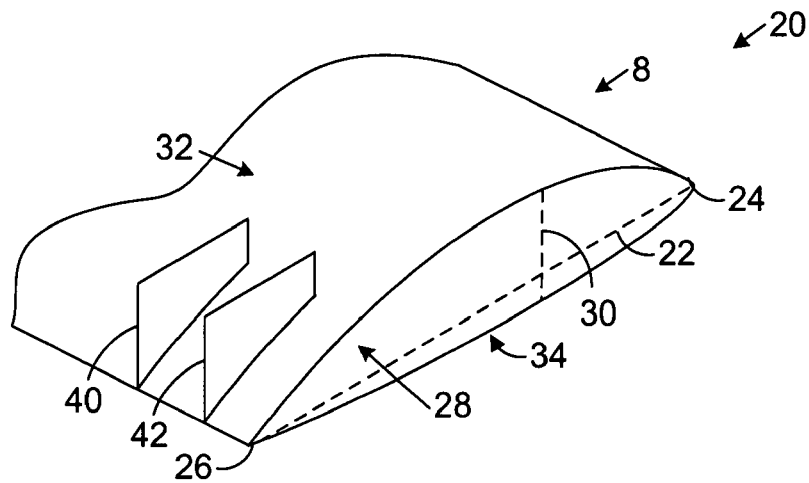
FIG. 2 is an orthographic view of a wind turbine blade tip vortex breaker system.
Figure 3:
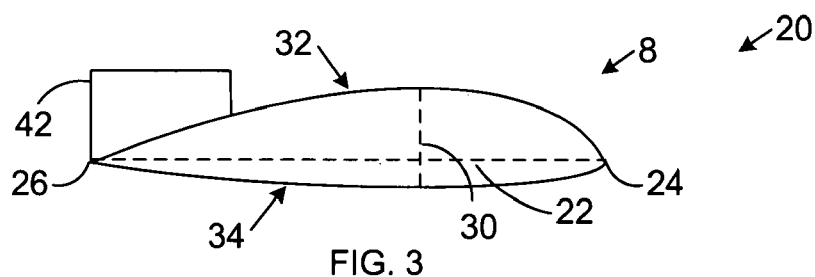
FIG. 3 is an end view of the wind turbine blade tip vortex breaker system illustrated in FIG. 2.

FIG. 2 is an orthographic view of an enlarged tip portion of a wind turbine blade including one example of a tip vortex breaker system 20. FIG. 3 is an end view of the wind turbine blade vortex breaker system 20 illustrated in FIG. 2. In FIGS. 2 and 3, the tip vortex breaker system 20 is illustrated in connection with the blade 8 shown in FIG. 1. However, any other wind turbine blade may also be used. For example, the vortex breaker system 20 may be used with blades having other planforms, cambers, thicknesses, aspect ratios, and/or tip geometries in addition to the ones illustrated in the figures here.

In FIGS. 2 and 3, the dashed line represents a tip chord line 22 that extends from the leading edge 24 to the trailing edge 26 of the turbine blade 8. Although the length of this chord line 22, or chord, is illustrated in these figures as being constant for the span of the blade 8 from the root (not show) to the tip 28, the chord may vary along the span of the blade. The maximum thickness 30 of the blade 8 at the tip chord line 22 shown here is illustrated by another dashed line which extends from the upper, low pressure, or suction surface 32 to the lower, high pressure surface 34. The maximum thickness 30 may also vary along the span of the blade 8.

The blade 8 is provided with two or more flaps 40 and 42 extending from the suction surface 32 near the tip of the blade. However, any number of additional flaps may also be provided inboard and/or outboard of the illustrated flaps 40 and 42. The flaps 40 and 42 are spaced-apart from each other by a distance that will allow air flow between the flaps. For example, the spacing between the flaps 40 and 42 may be up to twice the maximum thickness 30 of the blade 8, or between once or twice the maximum thickness 30. The maximum thickness at any chord line near the tip may be approximated may be approximated by the maximum thickness at the tip chord line, and/or at the outermost chord line which is still substantially perpendicular to the leading and trailing edges of the blade.

The flaps 40 and 42 are arranged at or near the tip 28 of the blade 8 so that, during normal operation, it is expected that some or all of the vortex flow emanating from the high pressure zone near the, high pressure surface 34 and moving around the tip 28 toward the low pressure zone near the suction surface 32 will be captured in the space between the flaps 40 and 42 (and/or others, not shown). The captured vortices will then be flushed over the trailing edge 26 between the flaps so as to minimize aerodynamic noise. Since this vortex flow is typically most severe near the trailing edge 26 of the tip 34, the trailing edge of the flaps 40 and 42 may be arranged at or near the trailing edge of the blade 8. However since noisy vortex flows can also occur in front of, and/or behind, the trailing edge 26 of the blade 8, one or more of the flaps 40 and 42 may be displaced in front of or behind the trailing edge 26 as discussed below with regard to FIGS. 4, 5, 11, and 12. The number of flaps 40 and 42 may be chosen so as to catch most or all the vortex flow between the flaps and is typically expected to include about two to ten, or, more specifically, two to five flaps.

Each of the inboard flap 40 and the outboard flap 42 is illustrated here as being fixed to the blade 8 along one edge, with each of those fixed edges being aligned with a different chord line in the direction of flow across the blade 8. However, one or both of the flaps 40 and 42 may be moveably positioned relative to the suction surface 32 or other part of the blade 8. For example, one or both of the flaps 40 and 42 may be retractable into the blade 8, hinged at their connected edges, and/or rotatable on an axis which is perpendicular to the suction surface 32 in order to better align the flaps with airflow across the blade in order to minimize drag. The positioning of such moveable flaps may also be automatically controlled based upon various environmental conditions, such as wind speed, and/or operating set points, such as rotor speed.

The embodiments illustrated here also show the flaps 40 and 42 extending substantially perpendicular from the suction surface 32 and substantially parallel to each other. However, one or both of the flaps may slant, curve, or be otherwise directed to the inboard and/or outboard direction of the blade 8. For example, the inboard flap 40 may be curved in order to generally correspond to the radius of the expected vortex flow while the outboard flap 42 slants toward the tip 34 in order to provide a wider top opening between the blades in which to receive the vortex flow.

In FIGS. 2 and 3, the flaps 40 and 42 are substantially the same in size, shape, and position along different chord lines relative to the trailing edge 26 of the blade 8. Arranging the flaps 40 and 42 along chord lines, which generally correspond to the direction of flow across the blade 8, minimizes the apparent cross-section of the flaps 40 and 42 and corresponding drag on the blade 8. The flaps 40 are also substantially flat and as thin as possible in order to further minimize drag while still maintaining their structural rigidity. In some circumstances, rotating or thickening the flaps 40 and 42 so as to unintentionally or knowingly increase their apparent cross-section to the flow across the blade 8 may nonetheless result in acceptable levels of drag.

The leading edges of the flaps 40 and 42 shown in FIGS. 2 and 3 are shorter than the trailing edges of the blades in order to further minimize the size of the leading edge cross-section and thus reduce drag. For example, the height of leading edge of the flaps 40 and 42 may be up to the maximum thickness 30 of the blade 8, or, more specifically, between one-half and one times the maximum thickness 30 on the corresponding chord line for the flap or tip chord for the blade 8. The height of the trailing edge of the flaps 40 and 42 may be up to four times the maximum thickness 30 of the blade 8, or, more specifically, between two and four times the maximum thickness 30 on the corresponding chord line for the flap, the chord line at the maximum overall thickness of the blade, or the tip chord for the blade 8. However, other leading edge and trailing edge sizes and shapes may also be used. For example, with a blade 8 having a fifty meter span length from root to tip, the flaps 40 and 42 may be up to about up to 0.1 meters tall or about 0.2% of the span length. For shorter blades 8, the flaps 40 and 42 may be up to about 0.5% of the span length for a flap height range for various blade sizes of around 0.2% to 0.5% of span.

In FIGS. 2 and 3, the length of the flaps 40 and/or 42 along the corresponding chord line may be between 0.1 and 0.7 times, or, more specifically, between 0.2 and 0.6 times the length of the chord line on which the flap is aligned. However, other flap lengths may also be used. The chord length on which the flap is aligned can be approximated as the tip chord length for the blade 8. For blade tips that are not squared off (unlike those illustrated here) and/or other blade configurations, the tip chord may be approximated as the length of the outermost chord line which is still substantially perpendicular to the leading and trailing edges of the blade.

With regard to the chord position of the flaps 40 and/or 42, the flaps may extend up to 0.2 times the corresponding chord length beyond trailing edge, or more specifically, up to 0.1 times the corresponding chord length beyond the trailing edge. The flaps may start at least 0.15 times the corresponding chord length downstream of the leading edge, or more specifically, up to 0.3 times the corresponding chord length downstream of the leading edge. However, other chord positions may also be used. The chord length on which the flap is aligned can be approximated as the tip chord length for the blade 8. For blade tips that are not squared off (unlike those illustrated here) and/or other blade configurations, the tip chord may be approximated as the length of the outermost chord line which is still substantially perpendicular to the leading and trailing edges of the blade.

With regard to the span position of the flaps 40 and 42, the flaps may be located inboard of the tip within four times the corresponding chord length on which the flap is aligned, or, more specifically, inboard of the tip within two times the corresponding chord length. However, other span positions may also be used. The chord length on which the flap is aligned can be approximated as the tip chord length for the blade 8. For blade tips that are not squared off (unlike those illustrated here) and/or other blade configurations, the tip chord may be approximated as the length of the outermost chord line which is still substantially perpendicular to the leading and trailing edges of the blade.

Figure 4:
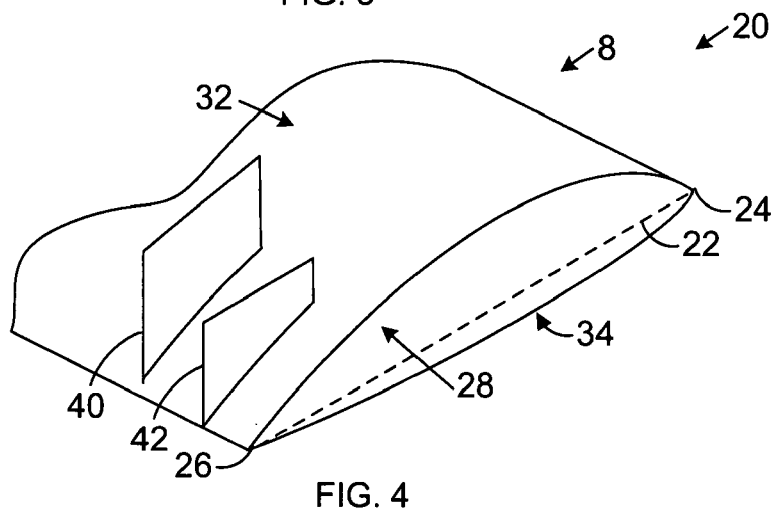
FIG. 4 is an orthographic view of another wind turbine blade tip vortex breaker system.
Figure 5:
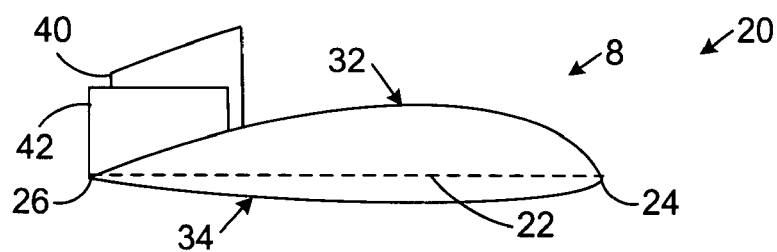
FIG. 5 is an end view of the wind turbine blade tip vortex breaker system illustrated in FIG. 4.

With regard to shape, the top edge 44 of the flaps 40 and 42 in FIGS. 2 and 3 is substantially parallel to the chord line 22. However, other flap shapes may also be used, including the shapes discussed in more detail below. For example, FIGS. 4 and 5 illustrate another embodiment of the wind turbine blade vortex breaking system 20 where the inboard flap 40 and outboard flap 42 have different sizes, shapes, and positions along their corresponding chord lines. In FIGS. 4 and 5, the inboard flap 40 is taller than the outboard flap 42, and displaced from the trailing edge 26 of the blade 8. In addition, the leading edge of the inboard flap 40 is substantially the same height from the suction surface 32 along the entire length of the flap 40. Consequently, the shape of the top edge 44 of the inboard flap 40 generally corresponds to the slope of the suction surface near the trailing edge 26. However, in other embodiments, the leading edge of one or both of the flaps 40 and 42 may be taller than the trailing edge of the corresponding flap.

Figure 6:
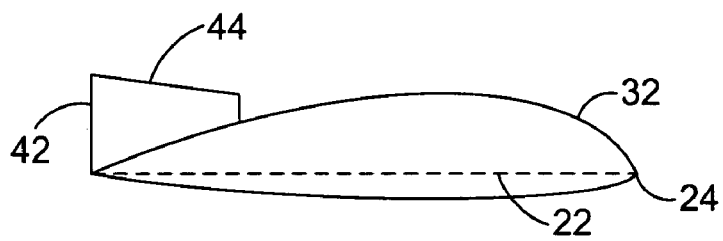
FIGS. 6-12 are end views of other wind turbine blade tip vortex breaker systems.
Figure 7:
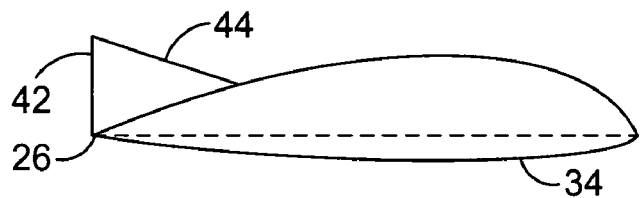
Figure 8:
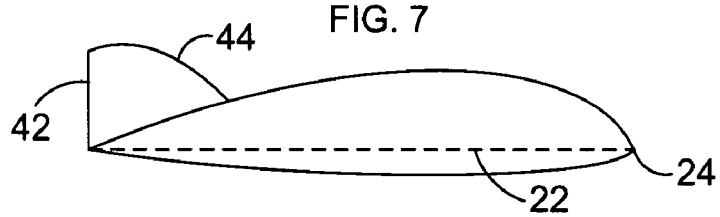
Figure 9:
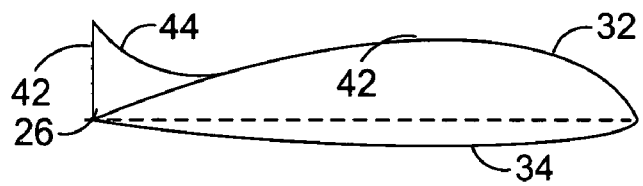
Figure 10:
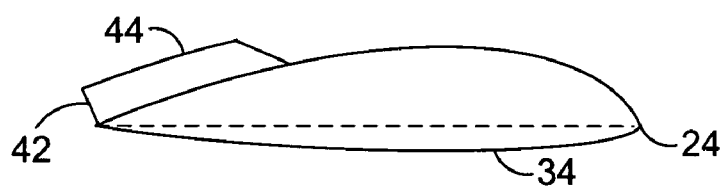
Figure 11:
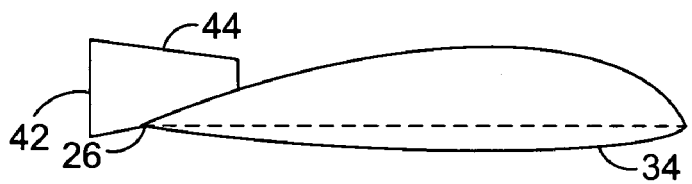
Figure 12:
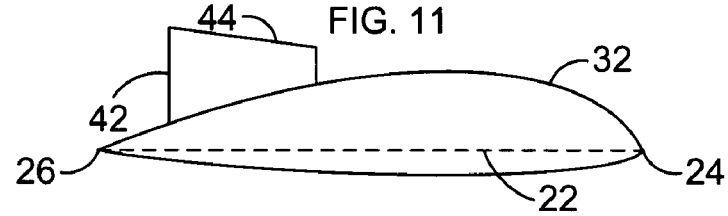

FIG. 6-12 illustrates various other embodiments of wind turbine blade vortex breaking systems 20 showing the flap 40 and/or 42 which, for simplicity, are referred to here as flaps 40. In FIG. 6, the flap 40 has a leading edge which is substantially shorter than a trailing edge of the flap so that the top edge 44 of the flap slopes toward the suction surface 32. FIG. 7 illustrates another embodiment of the wind turbine blade vortex breaking system 20 where the leading edge of the flap 40 has been further reduced so as create a three-sided flap 40 with a straight to edge 44. In FIG. 8, another three-sided flap 40 has been provided with a convex top edge 44 while the three-sided flap 40 shown in FIG. 9 has been provided with a concave top edge 44. In FIG. 10, the top edge 44 of the flap 40 has been arranged substantially parallel to the suction surface 32. In FIG. 11, the trailing edge of the flap 40 is arranged behind, and the bottom of the trailing edge is arranged below, the trailing edge of the blade 8. In FIG. 12, the trailing edge of the flap 40 is arranged in front of the trailing edge of the blade 8.

Contour plots (not shown here) from CFXpost software were used to compare calculated vorticity and pressure for a wind turbine blade vortex breaking system 20 similar to the one illustrated in FIGS. 2 and 3. For the base case without flaps 40 and 42, the highest vorticity and lowest pressure in the center of the vertex occurred near the trailing edge of the blade 8. Similar plots for the wind turbine blade vortex breaking system 20 with flaps 40 and 42 showed significantly lower vorticity and higher pressure in the center of these resulting vortices with the flaps 40 and 42. Such higher pressure is generally desirable for reducing fluid rotation, while lower vorticity tends to suggest lower noise and improved aerodynamic efficiency of the blade 8.

Figure 13:
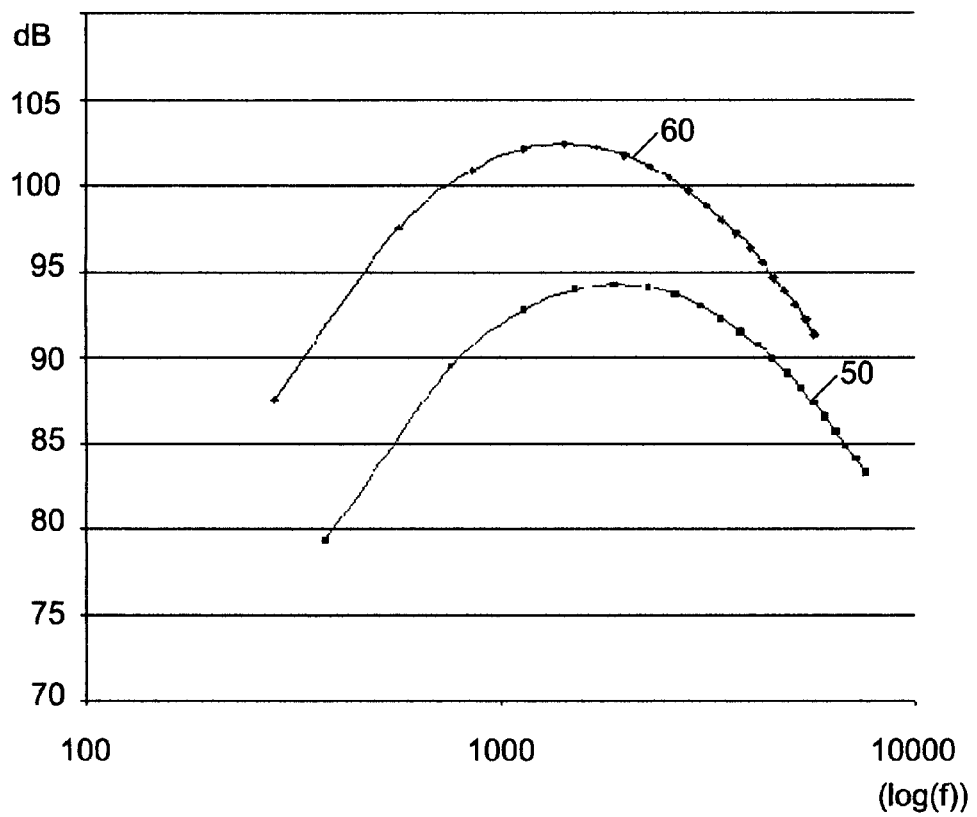
FIG. 13 is a comparative plot of calculated sound pressure level versus log of frequency for wind turbine blade tip vortex breaker system with and without the vortex breaker system illustrated in FIG. 2.
Figure 14:
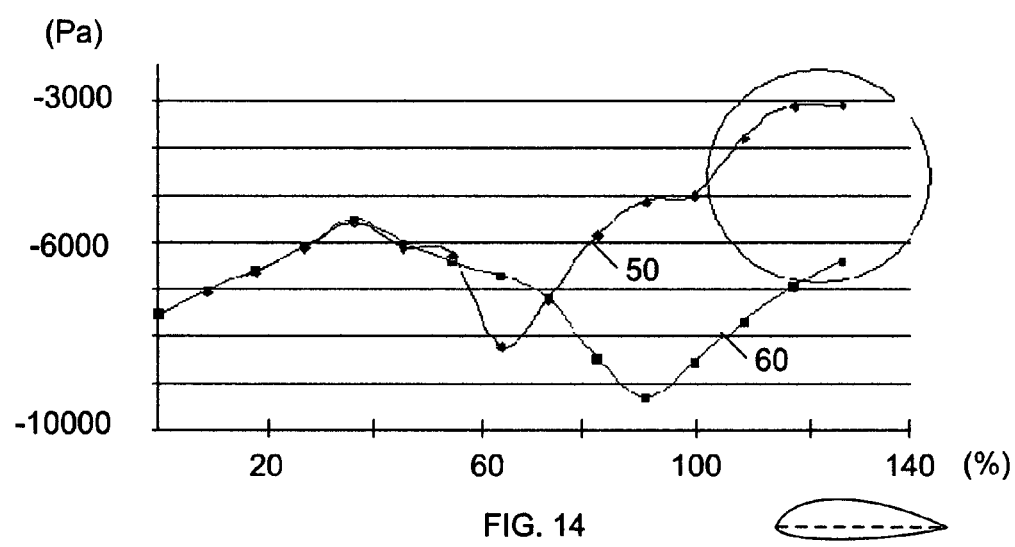
FIG. 14 is a comparative plot of calculated relative minimum pressure at vortex center versus relative chord position for the wind turbine blade vortex breaking system illustrated in FIG. 2.

FIGS. 13 and 14 illustrate the results of another computational fluid dynamics simulation for a wind turbine blade vortex breaking system 20 similar to the one illustrated in FIGS. 2 and 3. In these FIGs., the plot line 50 represents the blade vortex breaking system 20 (with flaps) while the plot line 60 represents the blade vortex breaking system 20 without the flaps 40 and 42.

FIG. 13 is a comparative plot of calculated sound pressure level in decibels versus log of frequency for wind turbine blade tips with and without the vortex breaker system illustrated in FIG. 2. The noise calculation used a correlation given by "Airfoil Tip Vortex Formation Noise," by Thomas F. Brooks and Michael A. Marcolini, in American Institute of Aeronautics and Astronautics Volume 24, Number 2. In this correlation, a parameter called "wetted length" is calculated at a plane (1/10th of chord) after the trailing edge by inspection turbulent kinetic energy for a contour value of 0.05. The wetted length is then used with a maximum MACH number to calculate a sound pressure level at the tip SPL(tip) for various frequencies. The plot illustrates a 6-8 decibel noise reduction for most frequencies.

A sound pressure level difference of 3 dB is roughly half the corresponding power level difference and thus commonly used as a point of reference in sound measurement. In practical terms, sound that is radiated from a point source drops in level at approximately 6 dB per doubling of distance. Therefore, if you start at 50 feet from the source and move to 100 feet from the source you will have a 6 dB drop in level. Similarly, if you move from 500 feet to 1000 feet, you will have a 6 dB drop in level. The wind turbine blade vortex breaking system 20 illustrated in FIGS. 2 and 3 is therefore expected to provide at least similar reductions in noise level.

FIG. 14 is a plot of calculated relative minimum pressure at vortex center in Pascals versus relative chord position for wind turbine blade tips with and without the vortex breaker system illustrated in FIG. 2. The circled portion of the chart in FIG. 14 illustrates an approximate 3500 to 4000 Pascal pressure difference over the baseline configuration without flaps near the trailing edge 26 of the blade 8 and up to 30% of the chord beyond the trailing edge.

Figure 15:
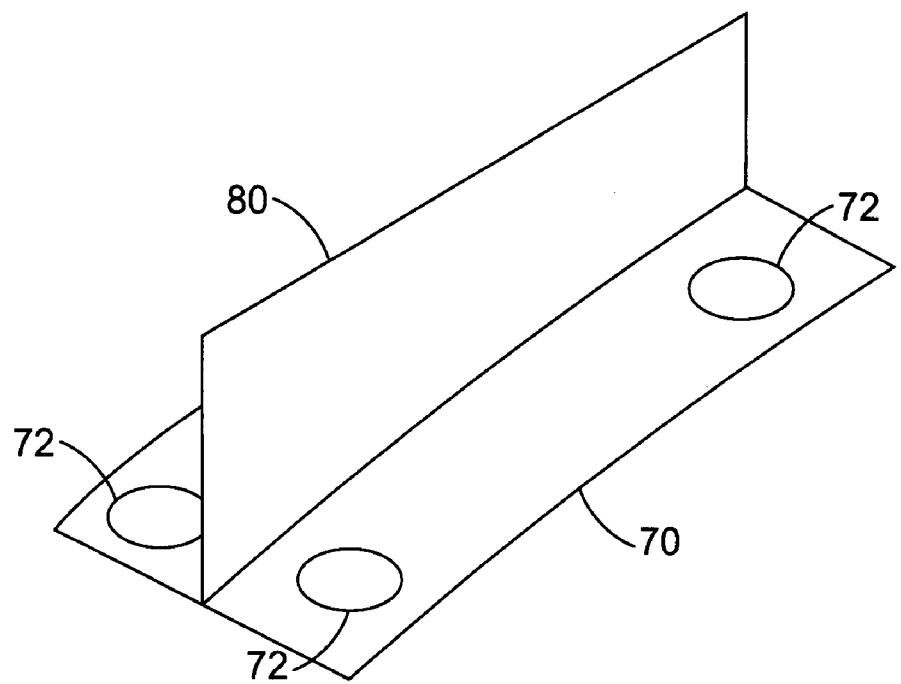
FIG. 15 is an enlarged orthographic view of a single flap for use with the wind turbine blade tip vortex breaker system of FIG. 2.
Figure 16:
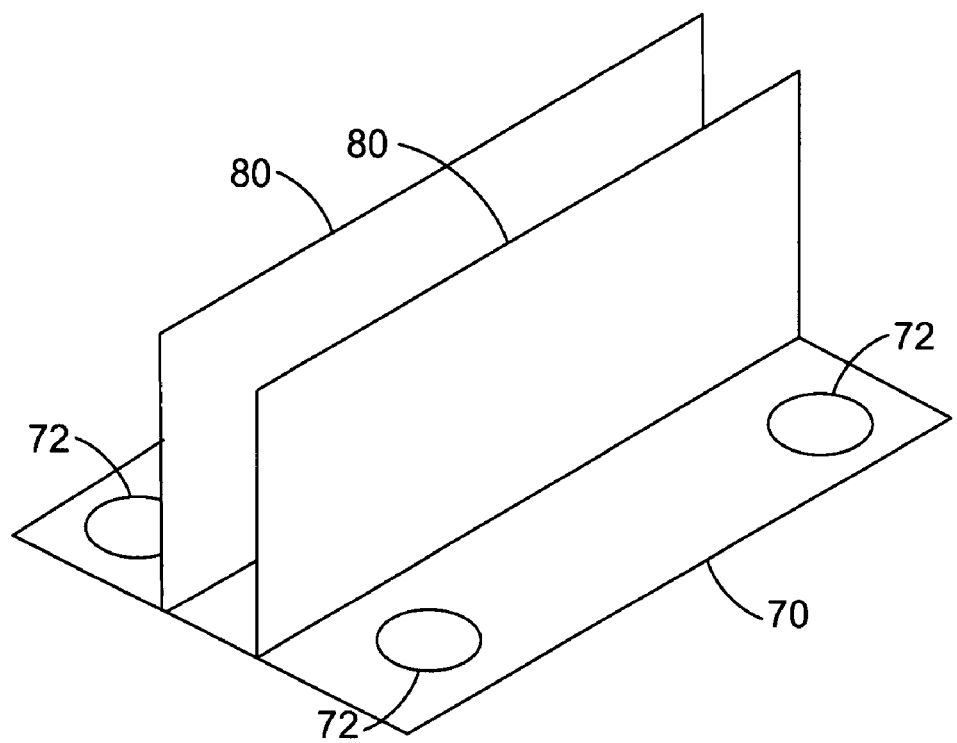
FIG. 16 is an enlarged orthographic view of a pair of flaps.

FIGS. 15 and 16 show enlarged orthographic views of a flaps 40 and/or 42 for use with the wind turbine blade tip vortex breaker system 20 in any of the previous FIGs. FIG. 15 illustrates a single flap configuration while FIG. 16 is an enlarged orthographic view of a pair of flaps. Each of these T-shaped configurations includes a base member 70 for securing to the suction surface 32 of the blade 8 by an suitable means including adhesive or fastening. For example, each of the base members 70 may be provided with fastener holes 72 for receiving bolts, pins, or other fasteners that secure the base member to the blade 8. The base member may also be curved to the general shape of the suction surface 32 as illustrated in FIG. 15. One or more arm members 80 then extends from the base member 70 for capturing and guiding vortex airflow as discussed above.

The previously described embodiments offer have many advantages. For example, FIGS. 13 and 14 show that the wind turbine blade vortex breaking system 20 illustrated in FIGS. 2 and 3 is expected to provide significantly improved noise reduction. It also is expected that other configurations of the wind turbine blade vortex breaking system 20, including those illustrated in FIGS. 4-12 and 15-16 would provide at least some level of beneficial noise reduction.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

What is claimed is:

1. A wind turbine, comprising:
   a tower supporting a drive train with a rotor;
   at least one blade extending radially from the rotor; and
   a plurality of substantially flat flaps extending substantially perpendicular from a suction surface of the blade and along different chord lines near a tip of the blade for capturing and directing tip vortices toward a trailing edge of the blade;
   wherein a trailing edge of each of the flaps is taller than a leading edge the corresponding flap; and
   wherein a length of each of the flaps is between approximately 0.2 times and 0.6 times a length of the corresponding chord line along which that corresponding flap extends.

2. The blade recited in claim 1, wherein an inboard one of the different chord lines is located less than twice the length of the inboard chord line from a tip of the blade.

3. The blade recited in claim 2, wherein the different chord lines are spaced apart less than two times a maximum thickness of the blade at one of the different chord lines.

4. A noise reduction system for a wind turbine blade, comprising
   a plurality of substantially flat flaps for capturing and directing tip vortices toward a trailing edge of the blade;
   each flap extending substantially perpendicular from a base for securing to a suction surface of the blade with an edge of each flap extending along a different chord line near a tip of the blade;
   wherein a trailing edge of each of the flaps is taller than a leading edge the corresponding flap; and
   wherein a length of each of the flaps is between approximately 0.2 times and 0.6 times a length of the corresponding chord line along which that corresponding flap extends.

5. The blade recited in claim 4, wherein an inboard one of the different chord lines is located less than twice the length of the inboard chord line from a tip of the blade.

6. The blade recited in claim 5, wherein the different chord lines are spaced apart less than two times a maximum thickness of the blade at one of the different chord lines.

* * * * *